US006151435A

United States Patent [19]

Pilloff

[11] Patent Number: 6,151,435

[45] Date of Patent: Nov. 21, 2000

[54] EVANESCENT ATOM GUIDING IN METAL-COATED HOLLOW-CORE OPTICAL FIBERS

[75] Inventor: Herschel S. Pilloff, Fort Washington, Md.

[73] Assignee: The United States of America as represented by the Secretary of the Navy, Washington, D.C.

[21] Appl. No.: 09/184,208

[22] Filed: Nov. 1, 1998

[51] Int. Cl.[7] .......... G02B 6/02

[52] U.S. Cl. .......... 385/125; 385/123; 204/192.38; 250/251

[58] Field of Search .......... 204/192.38; 250/251; 372/9, 20; 385/123, 125

[56] References Cited

U.S. PATENT DOCUMENTS 5,528,028 6/1996 Chu et al. .......... 250/251

*Primary Examiner*—Cassandra Spyrou
*Assistant Examiner*—Craig Curtis
*Attorney, Agent, or Firm*—Thomas E. McDonnell; Thomas E. McDonald; John G. Wynn

[57] ABSTRACT

A new type of atom guiding structure has been analyzed. It consists of a hollow-core optical fiber (step-index) which is not clad, but instead has a metal coating on its outer lateral surface. It will be shown that this structure produces the maximum evanescent field in the hollow region of the fiber and guiding can be accomplished with lower power lasers. Both the dipole and the vander Waals potentials have been combined and the resulting barrier height was maximized as a function of both Δ, the detuning, and r, the position. An optimized potential having a barrier height of 1 K has been determined by iteratively solving for the required laser intensity. The probability of atoms tunneling through this barrier to the inner wall has been calculated and is expected to be unimportant. Centripetal effects due to a bending of the fiber have also been estimated and are small for the barrier considered here. Compared to other structures, this new-type of guide provides bigger barriers for the same laser power, and therefore enhanced atom guiding.

2 Claims, 3 Drawing Sheets

Electric field strength $\mathcal{E}(r)$ for the $HE_{11}$ mode vs radius $r$

EVANESCENT ATOM GUIDING IN METAL-COATED HOLLOW-CORE OPTICAL FIBERS

BACKGROUND OF THE INVENTION

1. Technical Field

The invention relates generally to a method and apparatus for guiding atoms by blue-detuned evanescent waves in a hollow-core optical fiber. More particularly, the invention relates to the use of a metal-coated hollow-core optical fiber as the wave guide to maximize the evanescent guiding field in the hollow region of the fiber.

2. Background Art

The polarizability of an atom is almost always positive, but it can be negative and some unusual effects can then be observed. This can occur when a laser or other monochromatic source is tuned slightly above or to the "blue" of an atomic resonance. The interaction of the external field on the atom through its negative polarizability produces a gradient dipole force which tends to drive the atom to regions of minimum intensity. Cook and Hill suggested using an evanescent wave to produce an atom mirror outside of a dielectric. Reference: R. J. Cook, R. K. Hill, An Electromagnetic Mirror for Neutral Atoms, Optics Comm. 43 (1982) 258. Zoller, et. al. analyzed the case for a clad, hollow fiber in which the external field was confined to the annular region and used the resulting evanescent field in the hollow region to guide atoms. Reference: S. Marksteiner, C. M. Savage, P. Zoller, S. L. Rolston, Coherent Atomic Waveguides from Hollow Optical Fibers: Quantized Atomic Motion, Phys. Rev. A 50 (1994) 2680. In what has become known as "blue-guiding", Renn and Ito have experimentally demonstrated evanescent wave guiding of rubidium atoms in hollow optical fibers. See: M. J. Renn, E. A. Donley, E. A. Cornell, C. E. Wiemann, D. Z. Anderson, Evanscent-wave Guiding of Atoms in Hollow Optical Fibers, Phys. Rev. A 53 (1996) 648A; and H. Ito, T. Nakata, K. Sakaki, M. Ohtsu, K. I. Lee, W. Jhe, Laser Spectroscopy of Atoms Guided by Evanscent Waves in Micron-sized Hollow Optical Fibers, Phys. Rev. Lett. 76 (1996) 4500.

SUMMARY OF THE INVENTION

It is an object of the invention to provide an improved method for guiding atoms by evanescent laser light through hollow-core optical fibers, which maximizes the evanescent guiding field in the hollow region of the fiber.

It is another object of the invention to provide a new type of atom guiding structure which can be used in existing systems for guiding atoms through hollow-core optical fibers, which maximizes the guiding barrier for a given laser power.

It is a further object of the invention to provide such a new type of atom guiding structure which also minimizes the loss of atoms to the inner wall of the fiber from quantum tunneling.

It is still another object of the invention to provide such a new type of atom guiding structure which also minimizes the loss of atoms to the inner wall of the fiber from centripetal force due to physical bending of the fiber.

The atom guiding structure, according to the invention, comprises a hollow-core optical fiber (step index) which has a coating on its outer lateral surface of a material, such as a metal, which has a high optical reflectivity. Typically, this coating comprises a metal having very high electrical conductivity, such as silver, gold, chromium, and aluminum.

BRIEF DESCRIPTION OF THE DRAWINGS

FIG. 1. shows the longitudinal electric fields, $E_{z2}$, of the five lowest-order TM modes, $TM_{01}$ . . . $TM_{05}$, of the metal-coated hollow dielectric cylindrical atom guide analyzed herein, between the inner radius a, and the outer radius, b of the cylinder, normalized to 1 V/m at r=a, indicating that, for each mode, $E_{z2}$ has a maximum at r=a.

DESCRIPTION OF THE PREFERRED EMBODIMENTS

Figure 1:
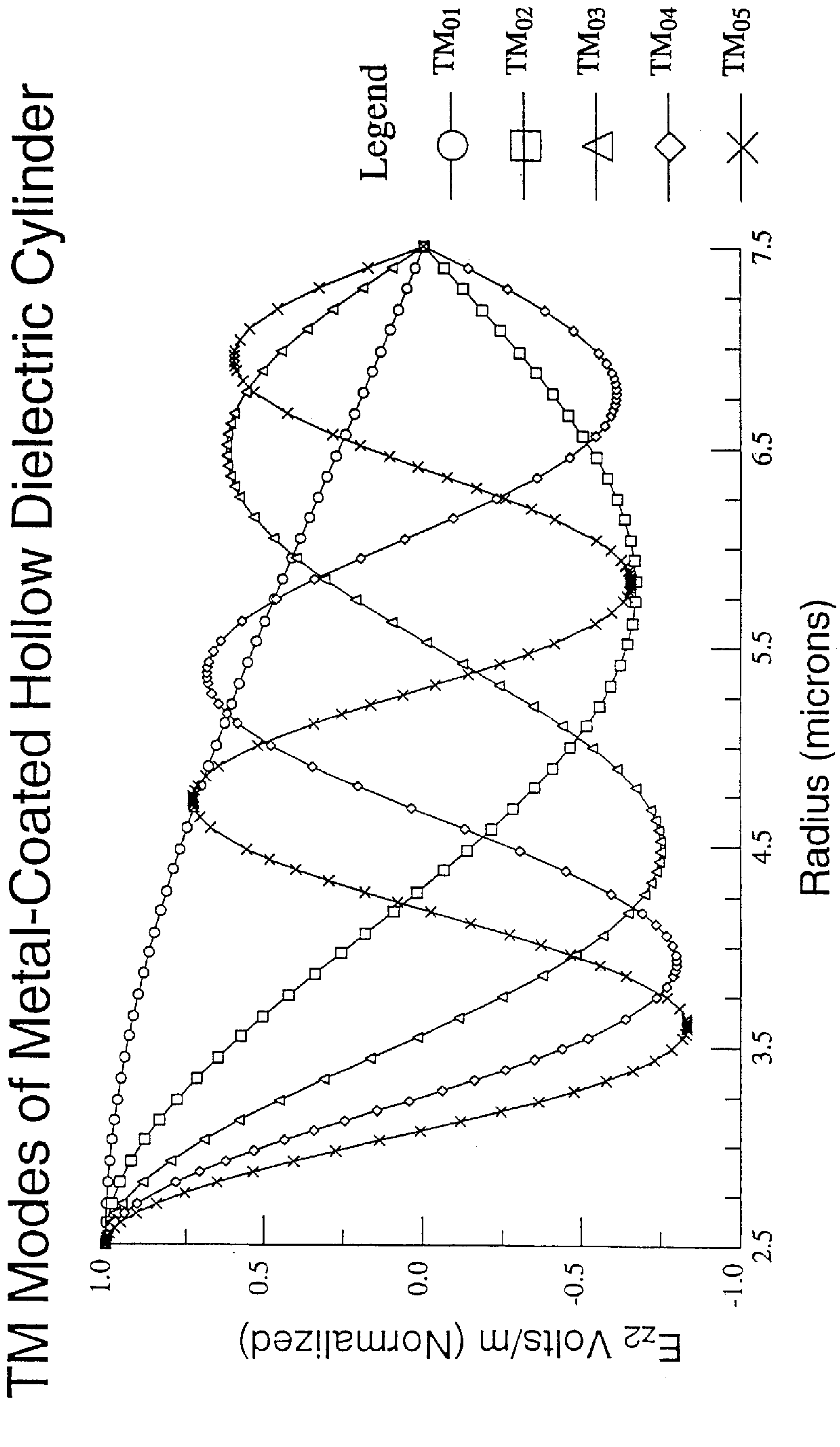

A new type of enhanced, atom guiding structure has been analyzed. It consists of a hollow-core, step index optical fiber which is not clad but instead has a metal coating on its outer lateral surface. It will be shown that the longitudinal electric fields of the lowest order $TM_{On}$ modes of this structure have a global maximum at the inner wall of the hollow fiber. This produces the maximum barrier and therefore, maximum guiding in the hollow region of the fiber.

A perfect, hollow dielectric cylinder of inner radius, a, outer radius, b, and longitudinal axis in the z direction, is analyzed as an atom guide. The outer lateral surface at radius, b, is assumed to be coated with a perfect conductor, This coating not only produces a structure having significant advantages as an atom guide but also greatly simplifies the boundary conditions. The lowest order TM modes of this infinitely long wave guide are calculated in the standard way, which is set forth in the textbook Fields and Waves in Communication Electronics, Third Edition,(Wiley, N.Y., 1993), which is incorporated herein by reference. The Helmholtz equation for $E_{z1}$ in the hollow region ($r \leqq a$) is given by:

$$\frac{\partial^2}{\partial r^2}E_{z1}(r,\phi)+\frac{1}{r}\frac{\partial}{\partial r}E_{z1}(r,\phi)+\frac{1}{r^2}\frac{\partial^2}{\partial\phi^2}E_{z1}(r,\phi)-\frac{w_1^2}{a^2}E_{z1}(r,\phi)=0 \tag{1}$$

where $$w_1^2=(\beta^2-k^2)\,a^2>0, \tag{2}$$

and $E_{z2}$ in the annular dielectric ($a \leqq, r \leqq b$) is $$\frac{\partial^2}{\partial r^2}E_{z2}(r,\phi)+\frac{1}{r}\frac{\partial}{\partial r}E_{z2}(r,\phi)+\frac{1}{r^2}\frac{\partial^2}{\partial\phi^2}E_{z2}(r,\phi)-\frac{u_2^2}{a^2}E_{z2}(r,\phi)=0 \tag{3}$$

where $$u_2^2=(k_2^2-\beta^2)a^2>0. \tag{4}$$

Here $w_1$ and $u_2$ are the eigenvalues of equations (1) and (3), respectively, $\beta$ is the propagation constant in the z direction, $k=2\pi/\lambda$ is the wave number (free space) where $\lambda$ is the wavelength, and $k_2=n_2 k$ is the wave number in the dielectric of index of refraction $n_2$. For zero azimuthal dependence, the general solution of equation (1) is $$E_{z1} = A I_0\left(\frac{w_1 r}{a}\right) + B K_0\left(\frac{w_1 r}{a}\right) \tag{5}$$

and for equation (3) is $$E_{z2} = C J_0\left(\frac{u_2 r}{a}\right) + D Y_0\left(\frac{u_2 r}{a}\right) \tag{6}$$

where $J_\nu$, $Y_\nu$, $I_\nu$, and $K_\nu$, are Bessel functions of order ν, as set forth in the Handbook of Mathematical Functions, M. Abramowitz and I. Stegun, Editors, (Dover, N.Y., 1965) pages 355–430, incorporated herein by reference. A, B, C, and D are constants determined by the boundary conditions. The zero azimuthal dependence automatically permits the exclusion of hybrid modes as the solutions separate into TM and TE sets.

Equations (5 and 6) are solved simultaneously subject to the following boundary conditions: $E_{z1}(r=0)$ is finite, $E_{z1}(r=a)=E_{z2}(r=a)=1$ (normalizes solutions to unity), $E_{z2}(r=b)=0$, and $H_{\Phi 1}(r=a)=H_{\Phi 2}(r=a)$. The solution of these equations gives the first of the two determinental equations, which for zero azimuthal dependence, reduces to $$\frac{I_1(w_1)}{w_1 I_0(w_1)} = \frac{\epsilon_2}{u_2\epsilon_1}\frac{\left(Y_0\left(\frac{u_2 b}{a}\right)J_1(u_2) - J_0\left(\frac{u_2 b}{a}\right)Y_1(u_2)\right)}{\left(-J_0\left(\frac{u_2 b}{a}\right)Y_0(u_2) + Y_0\left(\frac{u_2 b}{a}\right)J_0(u_2)\right)} \tag{7}$$

where $\in_1=\in_0$, the vacuum permittivity, and $\in_2=n_2^2\in_0$. For the case to be considered here where b=3a, this reduces to $$\frac{I_1(w_1)}{w_1 I_0(w_1)} = \frac{\epsilon_2(Y_0(3u_2)J_1(u_2) - J_0(3u_2)Y_1(u_2))}{\epsilon_1 u_2(-J_0(3u_2)Y_0(u_2) + Y_0(3u_2)J_0(u_2))} \tag{8}$$

The second determinental equation is obtained from (2) and (4) as $$u_2^2+w_1^2=a^2k^2(n_2^2-1). \tag{9}$$

Equations (8) and (9) can be solved either graphically or numerically for the eigenvalues, $w_1$ or $u_2$. For the parameters of the guide described here: a=2.5 μm, λ=0.5 μm, and $n_2=\sqrt{5}$, the results for the five lowest-order TM modes ($TM_{01}$ . . . $TM_{05}$) have been calculated and the corresponding eigenvectors $E_{z2}$ are shown in FIG. 1. It is significant that all of the $E_{z2}$ shown here have their global maximum value at r=a. This gives the maximum possible values for the evanescent fields, $E_{r1}$ at r=a, because the fields in the hollow region have unique solutions which do not depend on the solutions in the annular region except in so far as they are connected by the boundary conditions at the interface (r=a).

The potential ener for the interaction of an atomic dipole in an oscillating electric field is treated classically as $$U_{dip\_cl} = -\int_0^{|\vec{E}_0|}\vec{\mu}\cdot\frac{\vec{E}_0}{|\vec{E}_0|}dE = -\frac{1}{2}\alpha|\vec{E}_0|^2$$

where α is the polarizability. In the hollow part of the guide, E is the evanescent field $E_{r1}$, and neglecting the phase factor, $$E_{r1} = \frac{a\beta I_1\left(\frac{w_1 r}{a}\right)}{w_1^2 I_0(w_1)}E_L \tag{10}$$

where, for the guide considered here, $\beta=2.81\times10^7$ $m^{-1}$, $w_1=62.8$, $u_2=0.960$, and $E_L$ is the laser field strength in the dielectric at the interface r=a. The required laser intensity, $I_L$, is given by $I_L=\frac{1}{2}n_2\in_0 c\, E_L^2$. While the classical description of the dipole potential provides a simple understanding of the geometric aspects of this interaction because the induced dipole moment is co-linear with the evanescent field and this field must be in the radial direction in order to guide atoms, the quantum representation is necessary in order to analyze this problem in more detail. The quantum dipole potential, $U_{dip-qm}$, is given by $$U_{dip\_qm} = \frac{1}{2}\hbar\Delta\ln\left(1 + 2\frac{d^2E^2}{\hbar^2(\gamma^2+4\Delta^2)}\right) \tag{11}$$

where $\hbar=h/2\pi=1.05\times10^{-34}$J·s, the detuning $\Delta=\omega-\omega_0$, γ is the decay rate of the upper level, d is the transition dipole moment between levels 1 and 2, and E is the electric field amplitude given by equation (10). See: A. Ashkin, Phys. Rev. Lett. 40 (1978) 729; and J. Dalibard and C. Cohen-Tannoudji, J. Opt. Soc. Am. B 2 (1985) 1707. The van der Waals potential for an atom in proximity to an infinite dielectric slab is given by $$U_{vdw\_gen} = -\frac{1}{32\pi\epsilon_0}\left(\frac{\epsilon-1}{\epsilon+1}\right)\frac{\mu_\Sigma^2}{x^3}$$

where ∈ is the dielectric constant, $\mu^2_\Sigma$ is the sum of the squares of all the transition dipole moments, and x is the distance from the atom to the dielectric surface. See: M. J. Renn, E. A. Donley, E. A. Cornell, C. E. Wiemann, D. Z. Anderson, Evanscent-wave Guiding of Atoms in Hollow Optical Fibers, Phys. Rev. A 53 (1996) 648A, cited above. This represents an approximation of the attractive potential tending to draw the atom to the inner wall of the cylinder, Changing variables from x to r, the distance from the center of the cylinder, substituting $\in=n_2^2$, and adding a constant offset term to make $U_{vdw}=0$ at r=0 gives $$U_{vdw} = \frac{-1}{32\pi\epsilon_0}\left(\frac{n_2^2-1}{n_2^2+1}\right)\left(\frac{1}{(a-r)^3} - \frac{1}{a^3}\right)\mu_\Sigma^2 \tag{12}$$

The total potential, U, in the hollow region is obtained by adding (11 and 12) where $$U = \frac{1}{2}\hbar\Delta\ln\left(1 + 2\frac{d^2E^2}{\hbar^2(\gamma^2+4\Delta^2)}\right) + \frac{-1}{32\pi\epsilon_0}\left(\frac{n_2^2-1}{n_2^2+1}\right)\left(\frac{1}{(a-r)^3} - \frac{1}{a^3}\right)\mu_\Sigma^2 \tag{13}$$

A synthetic two level atom has been assumed for $U_{dip-qm}$ with the following properties: $d=2.10\times10^{-29}$ Cm and $\gamma=10^8$ $s^{-1}$. For $U_{vdw}$, a multilevel atom was assumed where $\mu^2_\Sigma=9\times10^{-58}$ $C^2m^2$ and is equivalent to a two-level atom whose transition dipole moment is 1.50×d. Substituting these values together with the solution for the $TM_{01}$ mode into (13) gives $$U = 5.25\times10^{-35}\Delta\ln\left(1 + 1.06\times10^{-41}\frac{(I_1(2.51\times10^7 r))^2 E_L^2}{10^{16}+4\Delta^2}\right) - 3.87\times10^{-49}(2.50\times10^{-6}-r)^3 + 2.48\times10^{-32} \quad (14)$$

Figure 2:
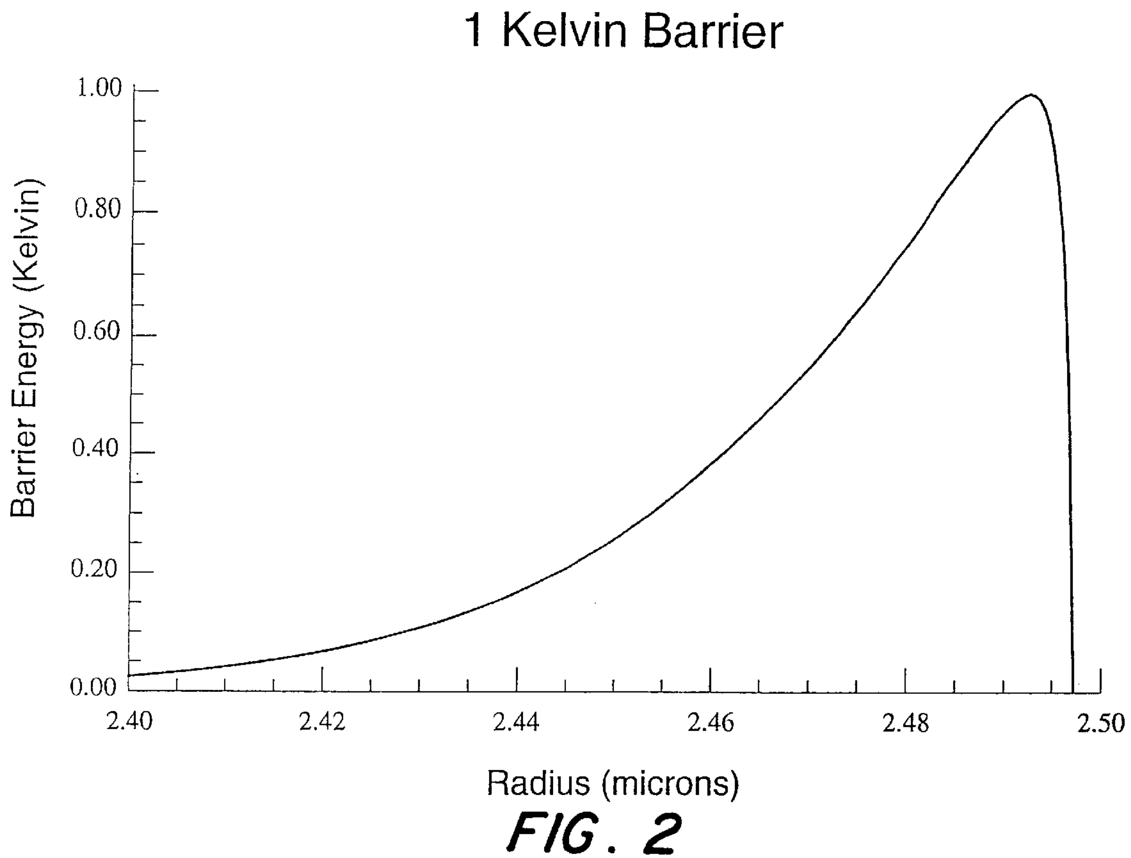
FIG. 2. shows the 1 K barrier an atom must tunnel through in order to reach the inner wall.
Figure 3:
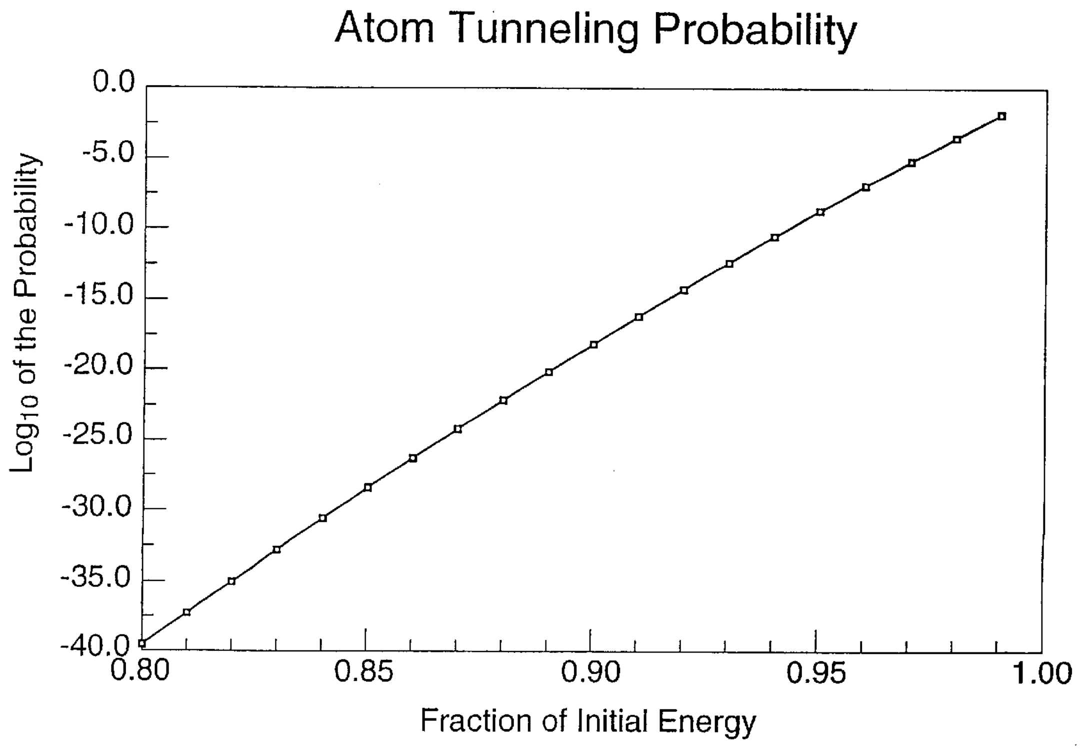
FIG. 3. shows the probability per bounce of tunneling through a 1 K barrier as a fraction of the initial energy.

Equation (14) was simultaneously maximized in both r and Δ. For $E_L$=2.68x10[6] V/m (corresponding to a laser input intensity of 2.13x10[6] w/cm[2]), $U_{max}$, the maximum value for U, was found to be 1.00 K for $\Delta=1.76\times10^{11}$ s$^{-1}$ and r=2.4925 μm. The 1 Kelvin barrier is shown in FIG. 2. This barrier is representative of conditions for which the loss of atoms via tunneling to the inner wall of the fiber is of interest. Near the inner wall, the van der Waals potential is strongly attractive and dominates the total potential there. The tunneling can be calculated using the WKB approximation, described in Quantum Theory, by D. Bohm (Prentice-Hall, N.Y., 1951) and in textbfQuantum Mechanics, by D. H. Rapp (Holt, Rinehart and Winston, N.Y., 1971), which yields $$T = \exp\left(-\frac{2}{\hbar}\int_{tp1}^{tp2}\sqrt{2m(U - fU_{max})}\,dr\right) \quad (15)$$

where T is the tunneling probability per bounce, tp1 and tp2 are the turning points for the initial energy, m is the mass of the atom and is taken here to be $4.00\times10^{-26}$ kg, U is given by equation(14), $f$ is the fraction of the total barrier height corresponding to the initial energy. This is at least a useful approximation as the tunneling is small in the region of interest, $f\leqq0.98$, and the de Broglie wavelength, $\lambda_{dB}$=0.901 nm for ($f$=0.98), is small compared to the minimum thickness, $(tp_2-tp_1)\geqq3.58$ nm, of the barrier in this region. The probability per bounce for an atom to tunnel through a 1 K barrier to the wall is shown in FIG. 3 where the fraction of initial energy ranges from 0.80 to 1.00 of the barrier height. For this barrier, the probability of tunneling per bounce is $T\leqq10^{-3}$ for $f\leqq0.98$ of the total barrier height. From FIG. 3, it can be seen that for $f\approx0.90$, quantum tunneling is expected to be unimportant.

Figure 4:
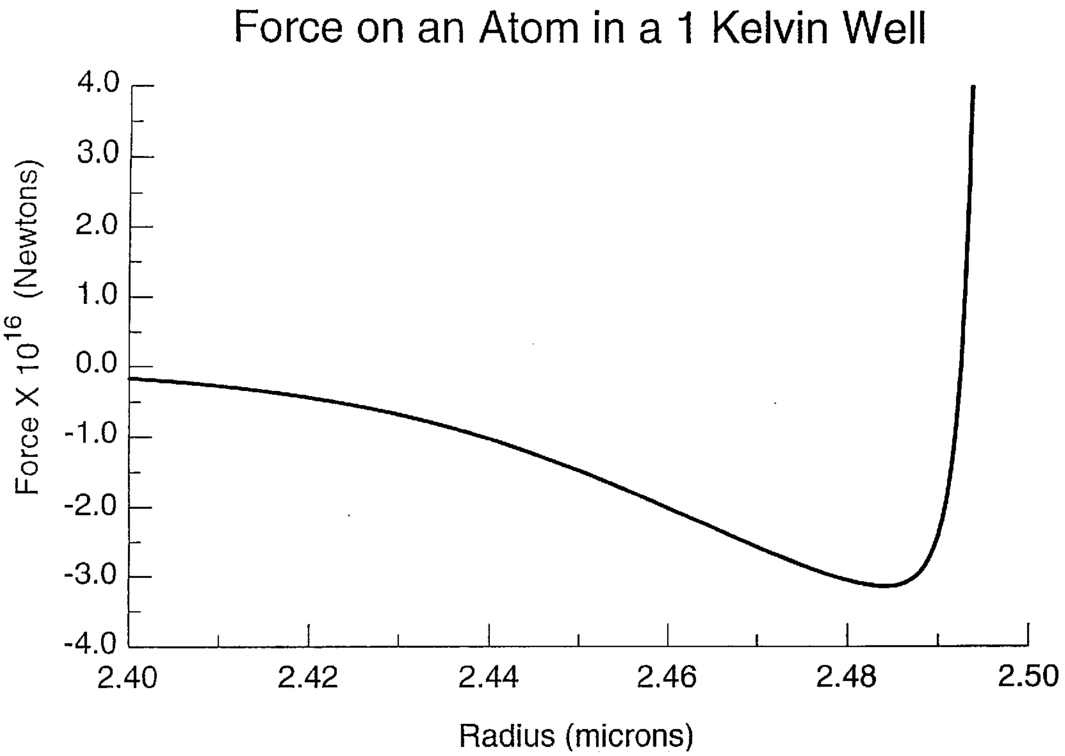
FIG. 4. shows the force on an atom in a 1 Kelvin Well.

A curved or bent fiber will generate a centripetal force on the atom as it moves in an arc around the bend. If this force is greater than the inward repulsive force of the potential, then the atom will penetrate the barrier, hit the wall, and be lost. For the 1 K barrier considered above, the force (which includes both the dipole and the van der Wall forces) is shown in FIG. 4. An estimate of the minimum bending radius, $$R_{min} = 2a\left(\frac{v_{\parallel}}{v_{\perp}}\right)^2,$$

is derived in a publication by J. P. Dowling and J. Gea-Banaeloche, Adv. At. Mol. Opt. Phys. 36 (1996) 1, and has been calculated in two references cited above, namely, S. Marksteiner, C. M. Savage, P. Zoller, S. L. Rolston, Coherent Atomic Waveguides from Hollow Optical Fibers: Quantized Atomic Motion, Phys. Rev. A 50 (1994) 2680; and M. J. Renn, E. A. Donley, E. A. Cornell, C. E. Wiemann, D. Z. Anderson, Evanscent-wave Guiding of Atoms in Hollow Optical Fibers, Phys. Rev. A 53 (1996) 648. Here a is the radius of the fiber, $v_{\parallel}$ is the longitudinal velocity, and $v_{\perp}$ is the maximum allowed trapped transverse velocity. For a 1 K barrier and a longitudinal velocity of the beam appropriate to 1000 K, $R_{min}$=0.5 cm., and centripetal effects are small for the potential used here.

Figure 5:
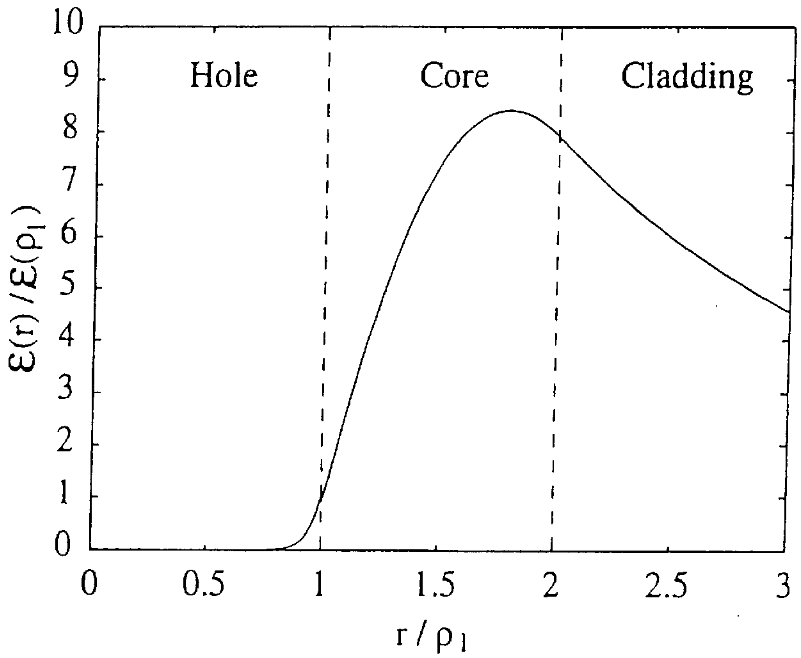
FIG. 5. shows the electric field strength, $E_z$, for the $HE_{11}$ mode vs the radius r for a clad hollow-core optical fiber (Reference: S. Marksteiner, C. M. Savage, P. Zoller, S. L.Rolston, Phys. Rev. A 50 (1994) 2680, cited above.).

Zoller, et. al. have reported a comprehensive analysis of evanescent blue-guiding of atoms. Refer to: S. Marksteiner, C. M. Savage, P. Zoller, S. L. Rolston, "Coherent Atomic Waveguides from Hollow Optical Fibers: Quantized Atomic Motion", Phys. Rev. A 50 (1994) 2680, cited above and incorporated herein by reference. They analyzed a clad, hollow dielectric fiber and primarily considered the hybrid $HE_{11}$ mode because they were mainly interested in a single mode fiber. The enhancement provided by the metal-coated fiber can be estimated by comparing the guiding produced by the $HE_{11}$ mode in their clad fiber with that in a $TM_{01}$ mode in an identical fiber except that the cladding has been removed and the outer dielectric surface is coated with a perfect conductor which is a perfect reflector. The radial dependence of the longitudinal electric field, $E_z$ from the above-cited reference (S. Maxksteiner, C. M. Savage, P. Zoller, S. L. Rolston, "Coherent Atomic Waveguides from Hollow Optical Fibers: Quantized Atomic Motion", Phys. Rev. A 50 (1994) 2680) is shown with permission in FIG. 5. It is seen that the maximum electric field occurs well inside the core and is about 8½ times larger than the field at the hole-core boundary ($r/\rho_1$=1) where $\rho_1$=a in their notation. (As expected, a calculation using their parameters (a=1.65 μm, b=3.3 μm, $n_2$=1.5, and λ=0.57 μm) for the $TM_{01}$ mode shows that the maximum value of $E_z$ occurs at (r=a)). The radial electric fields in the hollow region have been calculated for the $TM_{01}$ and $HE_{11}$ modes as $E_{r1TM}$ and $E_{r1HE}$, respectively. For the case where $E_{z2TM}$(r=a)=$E_{z2HE}$(r=a), $E_{r1TM}$ and $E_{Er1HE}$ appear to be identical. An amplitude scaling factor is defined as S=[$E_{z2}$(r=a)/$E_{z2}$(max)] and $S_{TM01}$=1.00 (FIG. 1) and $S_{HE11}$=~(8½)$^{-1}$ (FIG. 5). From the boundary conditions, $E_{z1}$(r=a)=$E_{z2}$(r=a) and $H_{z1}$(r=a)=$H_{z2}$ (r=a), it can be shown that $E_{r1}$ scales directly with S. The ratio of the radial electric fields can be written as [$E_{r1TM}$(r=a)/$E_{r1HE}$(r=a)]=$S_{TM01}/S_{HE11}$=~8½. Because the dipole potential, equation (13), depends on $E^2_{r1}$ in a somewhat complicated way.[1], and the enhanced guiding is due to the fact that one mode is more effective than another in producing a larger $E_{r1}$(r=a) for the same maximum value of $E_{z2}$, the enhancement will be calculated in terms of the increased laser intensity required to satisfy the condition: $E_{r1HE}$(r=a)=$E_{r1TM}$(r=a). The result is that the laser intensity must be increased by the factor $[S_{TM01}/S_{HE11}]^2$=~(8½)$^2$~72 in order for the dielectric-clad fiber to provide the same degree of guiding as in the metal-coated fiber.

[1]For small E, $U_{dip-qm}$~E$^2$, but for E=2.68x10[6] V/m, $U_{dip-qm}$ has dropped by nearly a factor of 3 from that predicted by the over-simplified ~E$^2$ dependence. Even so, atom guiding is significantly enhanced.

The use of the $TM_{01}$ mode in the metal-coated guide proposed here offers several advantages over structures considered previously. First, $E_{z2}$ has a global maximum at r=a and provides for maximum guiding in the hollow region. While FIG. 1 shows that the lowest five modes have a global maximum at r=a, it has not been proven that this is the case for all of the allowed $TM_{0n}$ modes. These modes are expected to be partially coherent and their travelling waves will average over the relatively slow motion of the atoms, and should only result in a modest correction to the effective laser field in the expression for $U_{dip-qm}$.

The use of the metal coated "atom guide" described herein will enhance the performance of, as well as permit the minaturization of devices such as atomic clocks, and atom interfer-ometers and their applications such as rotational and gravitational sensors.

What is claimed and desired to be secured by Letters Patent of the United States is:

1. An atom guiding apparatus which comprises:

a first vacuum chamber;

a second vacuum chamber;

a metal-coated hollow-core optical fiber extending between the first and second vacuum chambers, having a first open end extending into the first vacuum chamber and having a second opposite open end extending into the second vacuum chamber whereby the first chamber is in communication with the second chamber through the hollow-core portion of the optical fiber, the optical fiber having an annular dielectric portion with concentric inner and outer surfaces, the dielectric inner surface extending about and defining the hollow core of the optical fiber, and the dielectric outer surface being metal-coated;

atom supply means for supplying identical atoms into the first chamber;

atom directing means for directing at least some of the identical atoms toward and into the first open end of the optical fiber;

a tunable monochromatic light source, which is tuned slightly above the resonance of said atoms in the first vacuum chamber, and light directing means for directing the monchromatic light into one end of the annular dielectric portion of the fiber,the monochromatic light traversing the length of the optical fiber and producing a maximum evanescent field in the hollow portion of the optical fiber.

2. An atom guiding apparatus, as described in claim 1, wherein the metal coating comprises at least one of the following metals: gold, silver, chromium, nickel, and aluminum.

* * * * *